UNITED STATES PATENT OFFICE.

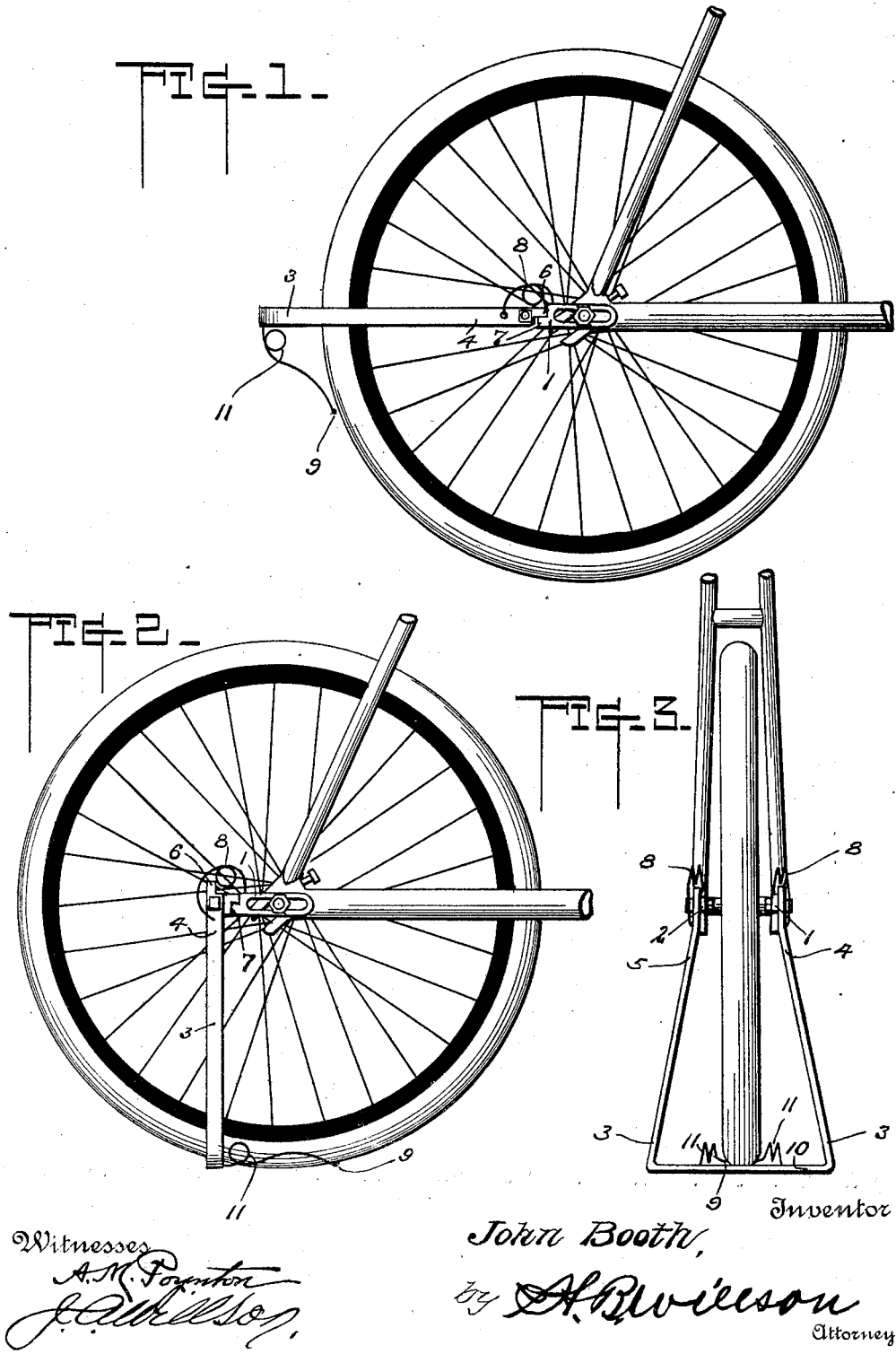

JOHN BOOTH, OF TERRE HAUTE, INDIANA.

BICYCLE-SUPPORT.

SPECIFICATION forming part of Letters Patent No. 608,749, dated August 9, 1898.

Application filed June 3, 1897. Serial No. 639,276. (No model.)

*To all whom it may concern:*

Be it known that I, JOHN BOOTH, a citizen of the United States, residing at Terre Haute, in the county of Vigo and State of Indiana, have invented certain new and useful Improvements in Bicycle-Supports; and I do declare the following to be a full, clear, and exact description of the invention, such as will enable others skilled in the art to which it appertains to make and use the same.

My invention relates to improvements in bicycle-stands, and the object is to provide a simple, convenient, and effective device of this character for making mounts and comfortably seating before starting the bicycle, making it easier for new beginners to learn to ride.

To this end the novelty consists in the construction, combination, and arrangement of the same, as will be hereinafter more fully described, and particularly pointed out in the claim.

In the accompanying drawings the same reference characters indicate the same parts of the invention.

Figure 1 is a side elevation of my improved stand as it appears attached to an ordinary bicycle. Fig. 2 is a similar view showing the stand in position to support the bicycle. Fig. 3 is an end view of the same.

1 and 2 represent slotted brackets which are conveniently secured by the nuts on the outer ends of the rear axle in a horizontal position and standing rearwardly on the bicycle.

3 represents a triangular frame, the ends of the converging arms 4 5 of which are pivoted to the brackets 1 and 2, so that the said frame has a vertical movement of about a quarter of a circle. The upper end of each arm is provided with a toe 6, which abuts against the vertical shoulders 7 7 on the brackets 1 and 2 to limit the upward movement of the frame and retain it in a horizontal position, as shown in Fig. 1.

8 8 represent coil-springs, the forward ends of which are suitably secured to the brackets 1 and 2 and their rear ends to the arms 4 and 5, so as to normally retain the frame in a horizontal position when not in use and also hold it under the wheel when it passes the center, pulls the other way, and retains it under the wheel.

9 represents a loop flexibly connected to the yoke 10 of the frame by spring-wire coils 11 11. When the frame is turned downwardly, as shown in Fig. 2, this loop is projected under the rear wheel and around it on the ground, so that the weight of the wheel rests on the ground, bound by the loop, and this enables the frame to support the bicycle in an upright position, as shown. If the bicycle be moved forward, the rear wheel passes over the loop and rests upon the ground. At the same time that the loop is released from between the wheel and the ground the coil-springs on the loop carries it past the center and the coil-spring on the bracket automatically restores it to the horizontal position.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

The combination with a bicycle of the slotted brackets 1 and 2 fixed to the rear axle and formed with the vertical shoulders 7, the triangular frame comprising the yoke 10 and the converging arms 4 and 5 formed with the toes 6 and transversely hinged to said brackets, the springs 8 8 having their free ends connected to said arms and brackets and adapted to sustain said frame in a horizontal position and the loop 9 flexibly connected to said yoke, substantially as shown and described.

In testimony whereof I hereunto affix my signature in presence of two witnesses.

JOHN BOOTH.

Witnesses:
GEO. E. PUGH,
GEO. W. GREEN.